(12) United States Patent
Coda et al.

(10) Patent No.: US 8,767,187 B2
(45) Date of Patent: Jul. 1, 2014

(54) DOPPLER COMPENSATION FOR A COHERENT LADAR

(75) Inventors: Robert J. Coda, Torrance, CA (US); Matthew J. Klotz, Pasadena, CA (US); Jean-Paul Bulot, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 287 days.

(21) Appl. No.: 13/324,155

(22) Filed: Dec. 13, 2011

(65) Prior Publication Data

US 2013/0148095 A1    Jun. 13, 2013

(51) Int. Cl.
*G01S 17/08* (2006.01)
*G01S 17/10* (2006.01)
*G01C 3/08* (2006.01)
*G01S 17/58* (2006.01)

(52) U.S. Cl.
CPC ............ *G01S 17/08* (2013.01); *G01S 17/102* (2013.01); *G01C 3/08* (2013.01); *G01S 17/58* (2013.01)
USPC ................... 356/4.01; 356/3.01; 356/5.01

(58) Field of Classification Search
CPC ..... G01S 17/102; G01S 17/328; G01S 17/06; G01C 3/08
USPC ............. 356/3.01–3.15, 4.01–4.1, 5.01–5.15, 356/6–22, 28, 28.5
See application file for complete search history.

(56) References Cited

U.S. PATENT DOCUMENTS

| | | |
|---|---|---|
| 3,790,278 A | 2/1974 | Buczek et al. |
| 4,743,110 A | 5/1988 | Arnaud et al. |
| 4,959,800 A | 9/1990 | Woolley |
| 5,398,130 A | 3/1995 | Redman |
| 5,847,816 A | 12/1998 | Zediker et al. |
| 6,259,803 B1 | 7/2001 | Wirtz et al. |
| 6,388,739 B1 | 5/2002 | Rice |
| 6,545,785 B1 | 4/2003 | Heflinger et al. |
| 6,823,033 B2 | 11/2004 | Fahim |
| 6,875,978 B2 | 4/2005 | Halmos |
| 6,885,299 B2 | 4/2005 | Cooper et al. |
| 7,414,706 B2 | 8/2008 | Nichols et al. |
| 7,495,994 B2 | 2/2009 | Makris et al. |
| 7,505,488 B2 | 3/2009 | Halmos |
| 7,545,312 B2 | 6/2009 | Kiang et al. |

(Continued)

FOREIGN PATENT DOCUMENTS

| | | | |
|---|---|---|---|
| FR | 2519771 | * 1/1982 | ............ G01S 17/66 |
| FR | 2 519 771 | 7/1983 | |
| WO | WO 2004/034530 | 4/2004 | |

OTHER PUBLICATIONS

A.L. Kachelmyer, "Spectrogram Processing of Laser Vibration Data," SPIE vol. 1936 Applied Laser Radar Technology (1993), p. 78-89.

(Continued)

*Primary Examiner* — Luke Ratcliffe

(74) *Attorney, Agent, or Firm* — Daly, Crowley, Mofford & Durkee, LLP

(57) ABSTRACT

In one aspect, a method includes representing a range of Doppler frequency offsets as a local oscillator waveform comprising a plurality of digital waveform samples, selecting a portion of the plurality of digital waveform samples using a Doppler value to form an optical heterodyne; and generating a signal associated with a target within a bandwidth of a receiver using the optical heterodyne.

20 Claims, 4 Drawing Sheets

(56) References Cited

U.S. PATENT DOCUMENTS

| | | |
|---|---|---|
| 7,684,957 B2 | 3/2010 | Ueno |
| 7,805,082 B1 | 9/2010 | Whiteaway |
| 8,487,808 B2 | 7/2013 | Boufounos et al. |
| 2003/0030882 A1 | 2/2003 | Garrett et al. |
| 2005/0051713 A1 | 3/2005 | Halmos |
| 2005/0099634 A1 | 5/2005 | Dubois et al. |
| 2005/0237533 A1 | 10/2005 | Lal et al. |
| 2006/0079773 A1 | 4/2006 | Mourad et al. |
| 2007/0166049 A1 | 7/2007 | Pearson et al. |
| 2009/0237292 A1 | 9/2009 | Tigrek et al. |
| 2009/0304393 A1 | 12/2009 | Kawanishi et al. |
| 2010/0014567 A1 | 1/2010 | Yamamoto |
| 2010/0102203 A1 | 4/2010 | Grund |
| 2013/0104661 A1 | 5/2013 | Klotz et al. |
| 2013/0148095 A1 | 6/2013 | Coda et al. |
| 2013/0148103 A1 | 6/2013 | Halmos et al. |
| 2013/0188167 A1 | 7/2013 | Halmos et al. |

OTHER PUBLICATIONS

Matthew P. Dierking and Bradley D. Duncan, "Periodic, pseudonoise waveforms for multifunction coherent ladar," Applied Optics, vol. 49, No. 10, Apr. 1, 2010, p. 1908-1922.

Monica L. Minden et al., "A Range-Resolved Doppler Imaging Sensor Based on Fiber Lasers," IEEE Journal of Selected Topics in Quantum Electronics, vol. 3, No. 4, Aug. 1997, p. 1080-1086.

Patent Application filed on Jan. 13, 2011, entitled: Range-Resolved Vibration Using Large Time-Bandwidth Product Ladar Waveforms, Halmos et al., 28 pages.

A.L. Kachelmyer, Range-Doppler Imaging: Waveforms and Receiver Design, Massachusetts Institute of Technology, Lincoln Laboratory, Lexington, Massachusetts, 1988, SPIE vol. 999 Laser Reader III, pp. 138-161.

EP Search Report for Application No. 12160148.8-220 dated Feb. 1, 2013, 8 pages.

Kachelmyer et al.; "Laser Vibration Sensing", The Lincoln Laboratory Journal, vol.8, No. 1, Jan. 1, 1995, 26 pages, XP55041316, ISSN: 0896-4130.

Kachelmyer; "Inverse Synthetic Aperture Radar (ISAR) Image Processing", Proceedings of SPIE, Jun. 1, 1992, pp. 193-205, XP55041385, ISSN: 0277-786X, DOI: 10.117/12.59222.

Sturm et al.; "A Technique for Removing Platform Vibration Noise from a Pulsed Ladar Vibration Sensor", Optics and Laser Technology, Elsevier Science Publishers BV., Amsterdam, NL., vol. 27, No. 5, Oct. 1, 1995, pp. 343-350, XP004026187, ISSN: 0030-3992, DOI: 10.1016/0030-3992(95)98695-0.

Extended European Search Report dated Feb. 22, 2013; for EP Appl. No. 12159971.

Response to Office Action filed by Foreign Associate dated Dec. 19, 2013, for EP Application No. 12159971.6.-1811, filed Mar. 16, 2012, 4 pgs.

European Search Report dated Apr. 17, 2013, for EP Appl. No. 12/182,615, 6 pgs.

Office Action dated Dec. 6, 2013 for U.S. Appl. No. 13/285,821, filed Oct. 31, 2011, 25 pgs.

The American Heritage Dictionary of the English Language, Fourth Edition. 2000. Houghton Mifflin Company. Updated in 2009. "The Free Dictionary: deterministic". http://thefreedictionary.com/deterministic. 2 pgs.

Office Action dated Nov. 26, 2013 for U.S. Appl. No. 13/324,162, filed Dec. 13, 2011, 13 pgs.

Office Action dated Nov. 13, 2013 for U.S. Appl. No. 13/706,746, filed Dec. 6, 2012, 13 pgs.

Response filed by Foreign Associate dated Dec. 27, 2013 for EP Appl. No. 12161856.5, 12 pgs.

Response filed by Foreign Associate dated Dec. 18, 2013 for EP Appl. No. 12160148.8, 13 pgs.

\* cited by examiner

DOPPLER COMPENSATION FOR A COHERENT LADAR

BACKGROUND

While collecting heterodyned data in a coherent LADAR (laser detection and ranging) system, velocity differences between a sensor and an object the sensor is evaluating cause large Doppler shifts in a received signal. These Doppler shifts cause the frequency of the heterodyned signal to vary. Thus, the bandwidth of the receiver must be sufficiently large to account for this variation in the frequency and, in most cases, an excessively large receiver bandwidth may be required.

SUMMARY

In one aspect, a method includes representing a range of Doppler frequency offsets as a local oscillator waveform comprising a plurality of digital waveform samples, selecting a portion of the plurality of digital waveform samples using a Doppler value to form an optical heterodyne; and generating a signal associated with a target within a bandwidth of a receiver using the optical heterodyne.

In another aspect, an article includes a non-transitory machine-readable medium that stores executable instructions. The instructions cause a machine to represent a range of Doppler frequency offsets as a local oscillator waveform comprising a plurality of digital waveform samples, select a portion of the plurality of digital waveform samples using a Doppler value to form an optical heterodyne and generate a signal associated with a target within a bandwidth of a receiver using the optical heterodyne.

In a further aspect, an apparatus, includes circuitry to represent a range of Doppler frequency offsets as a local oscillator waveform comprising a plurality of digital waveform samples; select a portion of the plurality of digital waveform samples using a Doppler value to form an optical heterodyne; and generate a signal associated with a target within a bandwidth of a receiver using the optical heterodyne.

DETAILED DESCRIPTION

Described herein is an approach to select appropriate digital waveforms samples and timing of a local oscillator (LO) waveform in order to mix the LO waveform with a target echo and acquire target information inside a frequency range of a receiver. The techniques described herein allow a system to accommodate large Doppler shifts in signal without having to increase the receiver bandwidth required.

For example, the techniques described herein are applicable to a coherent LADAR (laser detection and ranging), which uses a linear frequency modulated (LFM) chirp optical transmit signal. In a coherent heterodyne system using LFM signals, an intermediate signal is formed by transmitting a LFM signal to an object, and optically heterodyning or mixing the received signal from the object with a local LFM signal at the receiver. The frequency of this intermediate signal formed after mixing is referred to as the intermediate frequency (IF). The local LFM signal is referred to as the local oscillator (LO) signal. The intermediate frequency produced from the mixed LO and received signal shifts in frequency with both range to object and relative velocity between sensor and object. The techniques described herein represent the entire range of Doppler frequency shifts as a LO signal comprised of digital waveform samples, and adjust the start and stop of the frequency modulation of the LO signal to compensate for target Doppler shifts, while simultaneously adjusting the timing of the LO relative to the transmit signal to account for IF frequency shifts due to range, enabling the receiver to accommodate very large target Doppler shifts without having to increase the receiver bandwidth necessary to capture signal information from the target. The frequency range over which the LO signal is modulated is adjusted independently of the frequency range of the transmit signal. In one example, the techniques described herein allows for systems using 100% duty cycle to maintain nearly complete overlap of the received and LO chirps, while accommodating a range of Doppler shifts limited only by the variability of the LO start and stop frequency.

Figure 1:
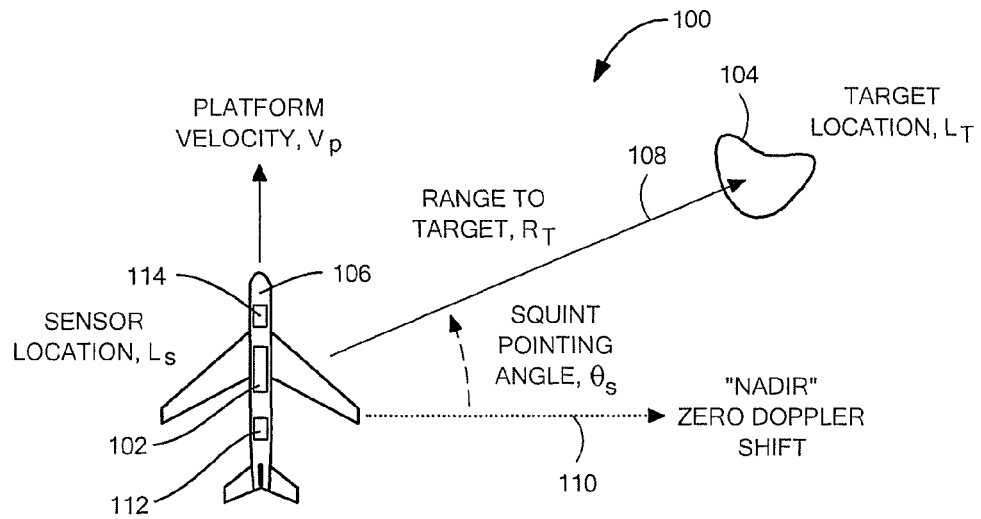
FIG. 1 is a block diagram of a LADAR environment.

Referring to FIG. 1, a LADAR environment 100 includes a LADAR sensor 102 at a location, $L_S$, to detect a target 104 at a location, $L_T$ with a range to target, $R_T$. The range to target, $R_T$, is a length of a vector pointing from the LADAR sensor 102 to the target 104. The LADAR sensor 102 is disposed on a sensor platform 106 traveling at a velocity, $V_P$. A line 108 between the LADAR sensor 102 and the target 104 and a nadir axis 110 form a squint angle, $\theta_S$. The nadir axis corresponds to an axis where the Doppler shift with respect to the LADAR sensor 102 is zero. For example, a target above the nadir axis 110 (i.e., in front of the sensor 102 or where the sensor 102 is moving towards) would have a blue Doppler shift while a target below the nadir axis 110 (behind the sensor 102 or where the sensor 102 is moving away from) would have a red Doppler shift. The nadir axis 110 is 90 degrees (orthogonal) to the sensor velocity (velocity of the platform) vector, $V_P$. For example, if you have a sensor on an aircraft, the nadir axis 110 will change as the aircraft turns or changes its flight profile or directional heading. In one example as described herein, the sensor platform velocity vector, $V_P$ is determined first and then the nadir axis 110 is determined from the sensor platform velocity vector, $V_P$. The squint angle, $\theta_S$ relative to the nadir vector is measured and a Doppler value of the target is determined using the sensor platform velocity, $V_P$ and the squint angle, $\theta_S$.

A GPS sensor 112 and a high precision angular resolver 114 are also disposed on the sensor platform 106. The angular resolver measures the angle between the nadir axis 110, and the range to target vector 108.

Figure 2A:
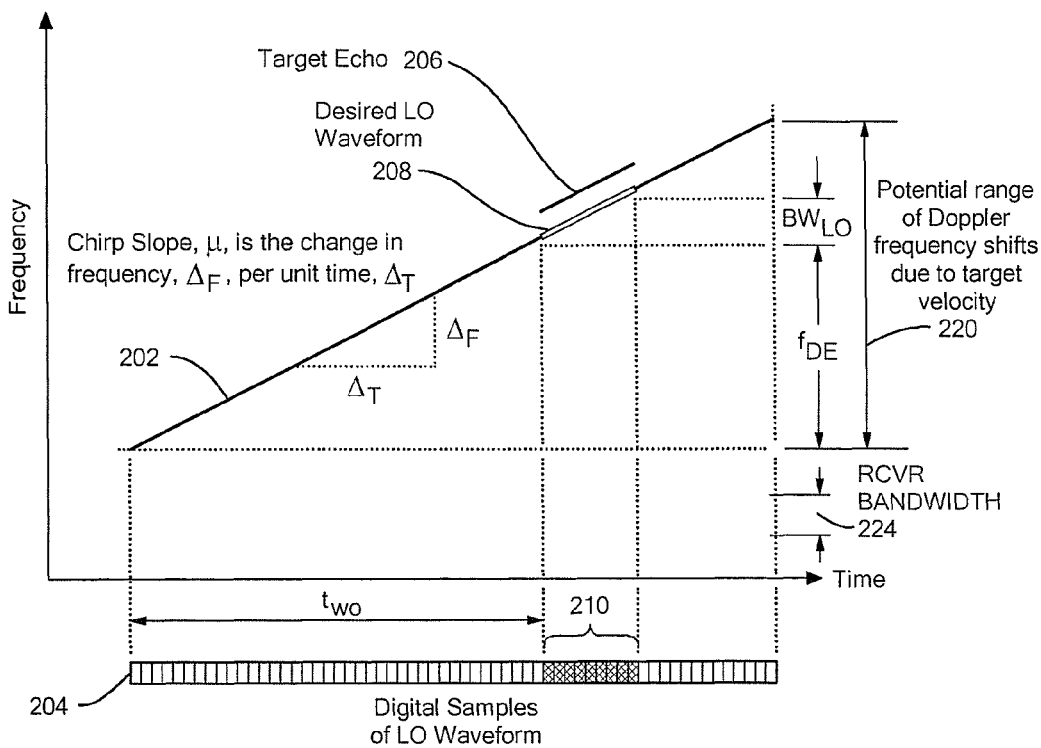
FIG. 2A is a graph of frequency over time of one period of a linear chirped waveform that, while not to scale, compares the magnitude of the receiver bandwidth and potential Doppler frequency shifts a LADAR sensor will encounter in operation.

Referring to FIG. 2A, the LADAR sensor, 102, is required to accommodate a very large range of target signal Doppler offsets, 220, and minimize the amount of intermediate frequency (IF) bandwidth, 224, that must be acquired and processed. For the technique described herein, a linear frequency modulation (FM) chirp signal or LO waveform 202 may be represented by a set of digital samples, 204, that spans the entire range of target Doppler frequency offsets, 220. Given a target echo 206, a desired LO waveform 208 is determined. The desired LO waveform 208 has a corresponding subset of digital samples 210 and is synthesized by clocking the digital samples 210 through a high speed digital to analog converter.

The LO waveform 202 has a chirp slope of t, which is the change in frequency, $\Delta_F$, per unit of time, $\Delta_T$. A Doppler estimate of the target echo, $f_{DE}$, is used to determine the subset of digital samples 210 corresponding to the desired LO waveform 208 starting at a time, two. The time, $t_{WO}$ is the Doppler estimate, $f_{DE}$, divided by the chirp slope, $\mu$. A LO waveform bandwidth, $BW_{LO}$ is also used to determine the subset of digital samples 210 of the desired LO waveform 208. The $BW_{LO}$ is controlled by a number of waveform samples clocked from memory to a digital to analog converter (DAC).

Figure 2B:
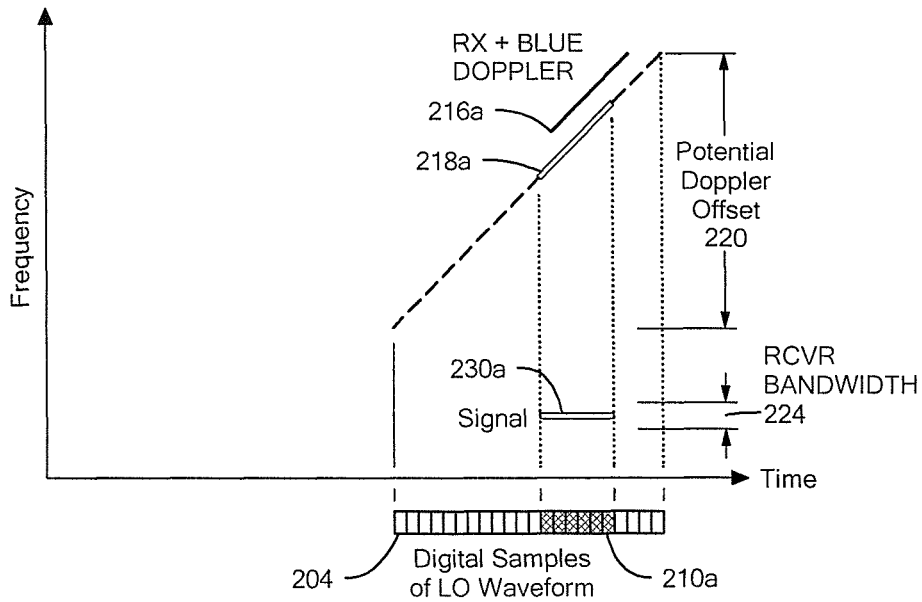
FIG. 2B is a graph of frequency versus time of a received signal with respect to the transmitted signal.
Figure 2C:
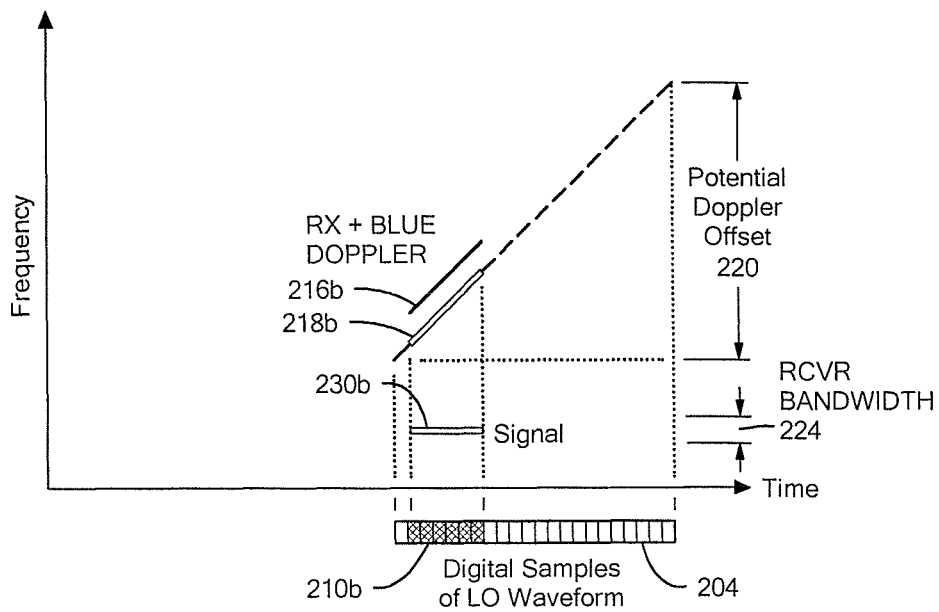
FIG. 2C is a graph of frequency versus time of another received signal with respect to the transmitted signal.

Referring to FIGS. 2B and 2C, a target signal 216a is a received optical signal plus a blue Doppler shift and has a potential Doppler offset 220. The signal 216a has a desired optical LO waveform 218a. A target signal 216b is a received optical signal less a red Doppler shift and has a potential Doppler offset 220. The signal 216b has a desired LO waveform 218b. As will be shown herein, knowledge of the sensor platform velocity $V_P$ and the squint angle, $\theta_S$, enables a selection of the subset of digital samples 210a corresponding to the desired LO waveform 218a in order to generate the proper optical heterodyne to generate a radio frequency signal 230a inside a receiver radio frequency bandwidth 224 and enables selection of the subset of digital samples 210b corresponding to the desired LO waveform 218b in order to generate the proper optical heterodyne to generate a radio frequency signal 230b inside the receiver radio frequency bandwidth 224.

Figure 3:
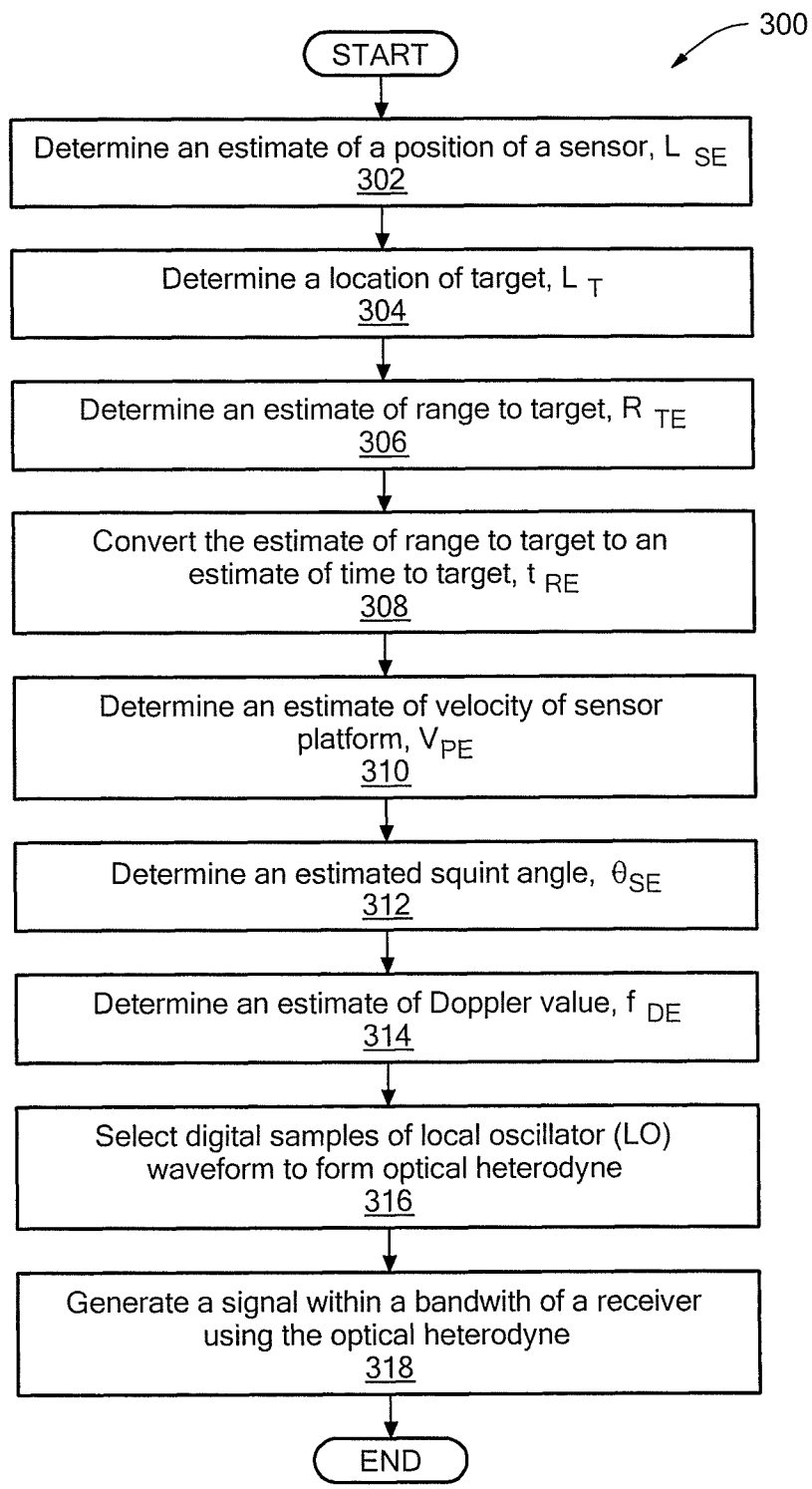
FIG. 3 is a flowchart of an example of a process to determine appropriate waveform samples.

Referring to FIG. 3, an example of a process to determine appropriate digital waveforms samples is a process 300. Process 300 determines an estimate of a position of a sensor (302). For example, an estimate of the position of the sensor 102, $L_{SE}$ is determined. For example, the GPS receiver 112 is used to determine an estimate of the position of the sensor 102, $L_{SE}$. An estimate of the position, $L_{SE}$, is determined since the sensor 102 is traveling on the sensor platform 106, and an exact position of the sensor $L_S$ is not known.

Process 300 determines a location of the target, $L_T$ (304). For example, the sensor 102 determines the position of the target 104, $L_T$.

Process 300 determines an estimate of the range to target, $R_{TE}$ (306). For example, the estimate of the range to target, $R_{TE}$, is the difference between the estimate of the location of the sensor, $L_{SE}$, and the location of the target, $L_T$.

Process 300 converts the estimate of the range to target, $R_{TE}$, to an estimate of the time to target, $t_{RE}$ (308). For example, the $t_{RE}$ is equal to two times the $R_{TE}$ divided by the speed of light.

Process 300 determines an estimate of the velocity of the sensor platform, $V_{PE}$ (310). For example, the GPS receiver 112 is used to determine an estimate of the velocity of the platform 106, $L_{SE}$.

Process 300 determines an estimate of a squint angle, $\theta_{SE}$ (312). For example, the squint angle, $\theta_{SE}$, is determined based on the estimate of the location of the sensor, $L_{SE}$.

Process 300 determines an estimate of the Doppler value, $f_{DE}$ (314). For example, the estimate of the Doppler value, $f_{DE}$, is determined from:

$$f_{DE} = (2V_{PE}/\lambda_L)(\cos \theta_{SE}),$$

where $\lambda_L$ is the laser wavelength of the LADAR sensor 102.

Process 300 determines the digital samples of the LO waveform to use to form optical heterodyne (316). For example, the digital samples of the LO waveform to use is based on the estimate of the Doppler value, $f_{DE}$ and the LO waveform bandwidth, $BW_{LO}$. Process 300 generates a signal with in a bandwidth of a receiver using the optical heterodyne (318).

Figure 4:
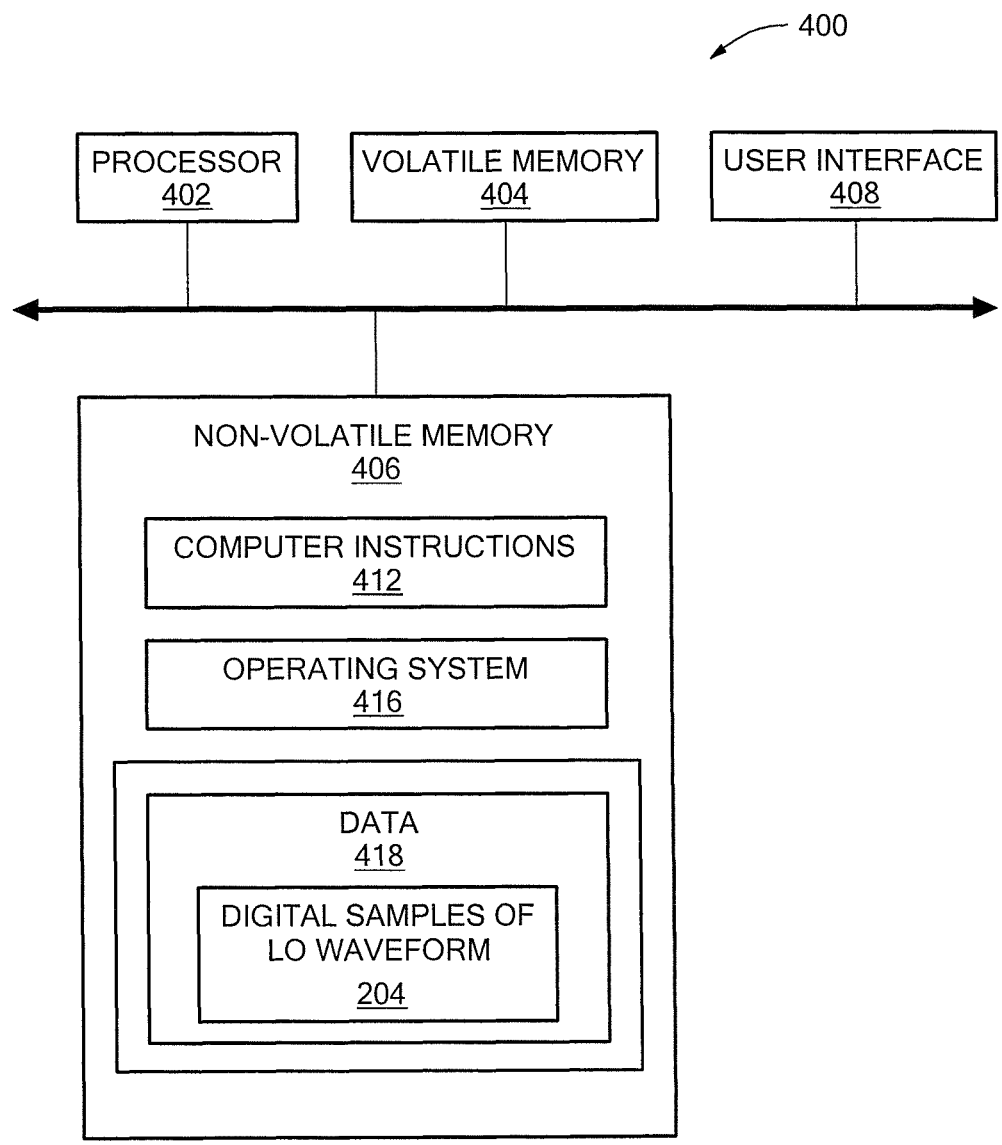
FIG. 4 is a computer on which the process of FIG. 3 may be implemented.

Referring to FIG. 4, a computer 400 includes a processor 402, a volatile memory 404, a non-volatile memory 406 and a user interface (UI) 408 (e.g., a mouse, a keyboard, a display, a touch screen and so forth). The non-volatile memory 406 stores computer instructions 412, an operating system 416 and data 418 (e.g., digital samples of LO waveform 204). In one example, the computer instructions 412 are executed by the processor 402 out of volatile memory 404 to perform all or part of the processes described herein (e.g., the process 300).

The processes described herein (e.g., the process 300) are not limited to use with the hardware and software of FIG. 4; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 300 is not limited to the specific processing order of FIG. 3. Rather, any of the processing blocks of FIG. 3 may be re-ordered, combined or removed, performed in parallel or in serial, as necessary, to achieve the results set forth above.

The processing blocks in FIG. 3 associated with implementing the system may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)). Elements of different embodiments described herein may be combined to form other embodiments not specifically set forth above. Other embodiments not specifically described herein are also within the scope of the following claims.

What is claimed is:

1. A method, comprising:
   representing a range of Doppler frequency offsets as a local oscillator waveform comprising a plurality of digital waveform samples;
   selecting a portion of the plurality of digital waveform samples using a Doppler value to form an optical heterodyne; and
   generating a signal associated with a target within a bandwidth of a receiver using the optical heterodyne.

2. The method of claim 1, further comprising:
   determining a velocity of a platform;
   determining a squint angle between a line from a LADAR sensor disposed on the platform to the target and a nadir axis; and
   determining a Doppler value using the velocity of the platform, a wavelength of the LADAR sensor and the squint angle.

3. The method of claim 2, further comprising:
   determining an estimated position of the LADAR sensor; and
   determining a location of the target;
   wherein determining a squint angle comprises determining an estimate of the squint angle using the estimated position of the LADAR sensor and the location of the target.

4. The method of claim 3 wherein determining the estimated position of the LADAR sensor comprises determining the estimated position of the LADAR sensor using a GPS receiver, and
   wherein determining the velocity of the platform comprises determining an estimated velocity of the platform using the GPS receiver.

5. The method of claim 2 wherein determining a Doppler value comprises determining an estimate Doppler value using the estimated velocity of the platform, a wavelength of the LADAR sensor and the estimate of the squint angle.

6. The method of claim 5 wherein determining an estimate of the Doppler value comprises determining an estimate of the Doppler value, $f_{DE}$, equal to:

$$f_{DE}=(2V_{PE}/\lambda_L)(\cos\theta_{SE}),$$

where $V_{PE}$ is the estimated velocity of the sensor platform, $\theta_{SE}$ is the estimate of the squint angle, and $\lambda_L$ is the wavelength of the LADAR sensor.

7. The method of claim 5, further comprising determining an estimated range to target based on the location of the target and the estimated position of the LADAR sensor.

8. An article comprising:
   a non-transitory machine-readable medium that stores executable instructions, the instructions causing a machine to:
   represent a range of Doppler frequency offsets as a local oscillator waveform comprising a plurality of digital waveform samples;
   select a portion of the plurality of digital waveform samples using a Doppler value to form an optical heterodyne; and
   generate a signal associated with a target within a bandwidth of a receiver using the optical heterodyne.

9. The article of claim 8, further comprising instructions causing the machine to:
   determine a velocity of a platform;
   determine a squint angle between a line from a LADAR sensor disposed on the platform to the target and a nadir axis; and
   determine the Doppler value using the velocity of the platform, a wavelength of the LADAR sensor and the squint angle.

10. The article of claim 9, further comprising instructions causing the machine to:
    determine an estimated position of the LADAR sensor; and
    determine a location of the target;
    wherein the instructions causing the machine to determine a squint angle comprises instructions causing the machine to determine an estimate of the squint angle using the estimated position of the LADAR sensor and the location of the target.

11. The article of claim 10 wherein the instructions causing the machine to determine the estimated position of the LADAR sensor comprises instructions causing the machine to deter nine the estimated position of the LADAR sensor using a GPS receiver, and
    wherein the instructions causing the machine to determine the velocity of the platform comprises instructions causing the machine to determine an estimated velocity of the platform using the GPS receiver.

12. The article of claim 11 wherein the instructions causing the machine to determine a Doppler value comprises instructions causing the machine to determine an estimate Doppler value using the estimated velocity of the platform, a wavelength of the LADAR sensor and the estimate of the squint angle.

13. The article of claim 12 wherein the instructions causing the machine to determine an estimate of the Doppler value comprises instructions causing the machine to determine an estimate of the Doppler value, $f_{DE}$, equal to:

$$f_{DE}=(2V_{PE}/\lambda_L)(\cos\theta_{SE}),$$

where $V_{PE}$ is the estimated velocity of the sensor platform, $\theta_{SE}$ is the estimate of the squint angle, and $\lambda_L$ is the wavelength of the LADAR sensor.

14. An apparatus, comprising:
    circuitry to:
    represent a range of Doppler frequency offsets as a local oscillator waveform comprising a plurality of digital waveform samples;
    select a portion of the plurality of digital waveform samples using a Doppler value to form an optical heterodyne; and
    generate a signal associated with a target within a bandwidth of a receiver using the optical heterodyne.

15. The apparatus of claim 14 wherein the circuitry comprises at least one of a processor, a memory, programmable logic and logic gates.

16. The apparatus of claim 14, further comprising circuitry to:
    deter nine a velocity of a platform;
    determine a squint angle between a line from a LADAR sensor disposed on the platform to a target and a nadir axis; and determine the Doppler value using the velocity of the platform, a wavelength of the LADAR sensor and the squint angle.

17. The apparatus of claim 16, further comprising circuitry to:
   determine an estimated position of the LADAR sensor; and
   determine a location of the target;
   wherein the circuitry to determine a squint angle comprises circuitry to determine an estimate of the squint angle using the estimated position of the LADAR sensor and the location of the target.

18. The apparatus of claim 17 wherein the circuitry to determine the estimated position of the LADAR sensor comprises circuitry to determine the estimated position of the LADAR sensor using a GPS receiver,
   wherein the circuitry to determine the velocity of the platform circuitry to determine an estimated velocity of the platform using the GPS receiver.

19. The apparatus of claim 18 wherein the circuitry to determine a Doppler value comprises circuitry to determine an estimate Doppler value using the estimated velocity of the platform, a wavelength of the LADAR sensor and the estimate of the squint angle.

20. The apparatus of claim 19 wherein the circuitry to determine an estimate of the Doppler value comprises circuitry to determine an estimate of the Doppler value, $f_{DE}$, equal to:

$$f_{DE} = (2V_{PE}/\lambda_L)(\cos\theta_{SE}),$$

where $V_{PE}$ is the estimated velocity of the sensor platform, $\theta_{SE}$ is the estimate of the squint angle, and $\lambda_L$ is the wavelength of the LADAR sensor.

* * * * *